United States Patent [19]

Boute

[11] 4,393,469

[45] Jul. 12, 1983

[54] PROCESS CONTROL APPARATUS

[75] Inventor: Raymond T. G. Boute, Destelbergen, Belgium

[73] Assignee: International Standard Electric Corporation, New York, N.Y.

[21] Appl. No.: 947,386

[22] Filed: Oct. 2, 1978

Related U.S. Application Data

[63] Continuation of Ser. No. 830,505, Sep. 6, 1977, which is a continuation of Ser. No. 670,327, Mar. 25, 1976.

[30] Foreign Application Priority Data

Apr. 1, 1975 [NL] Netherlands .................. 7503820

[51] Int. Cl.³ .............................................. G06F 9/06
[52] U.S. Cl. .................................................. 364/900
[58] Field of Search ... 364/200 MS File, 900 MS File, 364/100, 141, 172

[56] References Cited

U.S. PATENT DOCUMENTS

| | | | |
|---|---|---|---|
| 3,651,484 | 3/1972 | Smeallie | 364/200 |
| 3,753,243 | 8/1973 | Ricketts, Jr. et al. | 364/200 |
| 3,761,882 | 9/1973 | Bartlett et al. | 364/200 |
| 3,900,835 | 8/1975 | Bell et al. | 364/200 |
| 3,930,236 | 12/1975 | Ferguson | 364/200 |
| 4,101,967 | 7/1978 | Hajduk | 364/900 |

Primary Examiner—Harvey E. Springborn
Attorney, Agent, or Firm—James B. Raden; Marvin M. Chaban

[57] ABSTRACT

Process control apparatus for reading the condition of a selected variable and for generating a next instruction to be implemented based on the observed condition of the selected variable. The next instruction is that of reading one of two possible instructions, one of which causes the state of an output variable to be read and/or set and the other calls for reading the value of another selected input. In this manner, a program cycle is completed so that the values of all output variables can be set and read.

5 Claims, 2 Drawing Figures

PROCESS CONTROL APPARATUS

This is a continuation of application Ser. No. 830,505, filed Sept. 6, 1977: a continuation of 670,327, filed Mar. 25, 1976.

BACKGROUND OF THE INVENTION

The invention relates to a program controlled device including a memory storing a program of instructions and a control unit which includes an input circuit with a plurality of inputs to receive a plurality of input variables, a control circuit adapted to perform said instructions on said input variables and thus provide a value for a plurality of output variables, and an output circuit with a plurality of outputs via which said plurality of output variables can be collected.

Such a program controlled device, the control unit of which is adapted to carry out a number of logic operations on binary input variables in accordance with said program of instructions and for the purpose of obtaining binary output variables corresponding to the input set, is generally known as a programmable controller involving a succession of sets of values of input variables leading to a corresponding succession of values of output variables. The binary states of the above-mentioned input variables correspond for instance, to the closed or open conditions of a number of switches while the binary states of said output variables for instance, correspond to the energized de-energized condition of corresponding output devices such as solenoids, motor starters, etc.

In this known programmable controller the instruction program generally comprises a number of instructions which sequentially controls the execution of the AND, OR, INVERT operations needed for the evaluation of a Boolean expression, whereby the program is derived directly from this Boolean expression. Since each output variable may be a function of all of the input and output variables, the number of program instructions to be executed for obtaining an output variable depends on the number of prime implicants of the input and output variables and the simplest form of the Boolean expression with these prime implicants. For example, an expression with 5 variables (including possibly some or all of the output variables) may need about six prime implicants with three and four literals per implicant and may require the execution of 27 program instructions or steps. In such a case more than one instruction may be needed per input variable if this variable appears more than once in the above Boolean expression as is usually the case. Moreover, the program instructions are carried out independently from the binary value of the variables and in many cases the value of an output variable is already fixed after a number of instructions smaller than the total number of program instructions required per output variable.

More details about the preceding Boolean terminology used can for instance, be found on pages 61 to 109 of the book entitled "Logical Design of Digital Computers", 1959, by Montgomery Phister, Jr. and published by John Riley & Sons, Inc., New York.

From the above it follows that in certain cases a number of superfluous program steps are carried out to obtain the value of an output variable.

SUMMARY OF THE INVENTION

It is an object of the invention to provide a programmable controller wherein a finite number of single type instruction steps are needed in order to evaluate the condition of a lesser number of inputs thereby to change the condition of the output variables.

The present invention is characterized in that said program includes a set of single type instructions, each including the address of an input variable to be read and that a control circuit is adapted to derive from the value of said input variable read the address of a next following instruction among at least two instructions.

In a binary system, this value will be 0 or 1 and the choice of the next instruction will depend on the value of the input variable read.

A further characteristic of the invention is that said program further includes a second set of single type instructions each of which includes the address of an output variable to be set, its value and an address of the next following instruction.

In this way a number of instruction steps are saved. Indeed, in the worst case, when all the input variables have to be examined to evaluate an output variable the number of program steps is equal to n+1, i.e., the number of input variables n plus one instruction to obtain the output variable. For m output variables the number of steps is then m+n. In many cases the number of steps per output variable is less than n+1. Depending on the binary value of the input variable examined and on the switching function linking the above output variable to the n input variables an output variable may be obtained at the output of the controller after considerably less than n program steps.

It should be noted that the above-mentioned program configuration wherein the choice of the next instruction depends on the binary value of the input variable is generally known as a binary-decision program, described by C. Y. Lee in his paper "Representation of Switching Circuits by Binary-Decision Programs" on pages 985 to 999 and published in The Bell System Tehcnical Journal of July, 1959.

However, the binary-decision program described is used as a means of representing hard-wired switching circuits for implementing a fixed switching function. In the present application, the binary decision-program is used as the actual operational program for a programmable device with fixed hardware, capable of implementing different switching functions by modifying the program only.

In a preferred embodiment the programmable controller includes a memory to store the program of instructions and a control unit. This control unit comprises an input circuit to the inputs of which the binary values of a number of input variables are fed, an output circuit at the output of which the binary values of the output variables are collected and very simple logic circuitry processing the input variables following the program instructions. These instructions are of the same type and are called branch or output instructions depending on whether they examine an output or set the value of an output variable. In the case of a branch instruction and upon the occurrence of a clock pulse the memory is addressed and the addresses of the two next possible instructions are read out. The selection of the address of the next instruction depends on the binary value of the input variable read. If the instruction is an output instruction the binary value of the output variable read is supplied to a corresponding output of the output circuit and the address of the next following instruction is supplied to the memory. In this way all the input and output variables are handled. The last output instructions contain the address of the first instruction so that the program is started again to eventually obtain a new set of output values when the input values are modified.

BRIEF DESCRIPTION OF THE DRAWINGS

The above-mentioned and other objects and features of the invention will become more apparent and the invention itself will be best understood by referring to the following description of embodiments taken in conjunction with the accompanying drawings in which.

DETAILED DESCRIPTION

Figure 1:
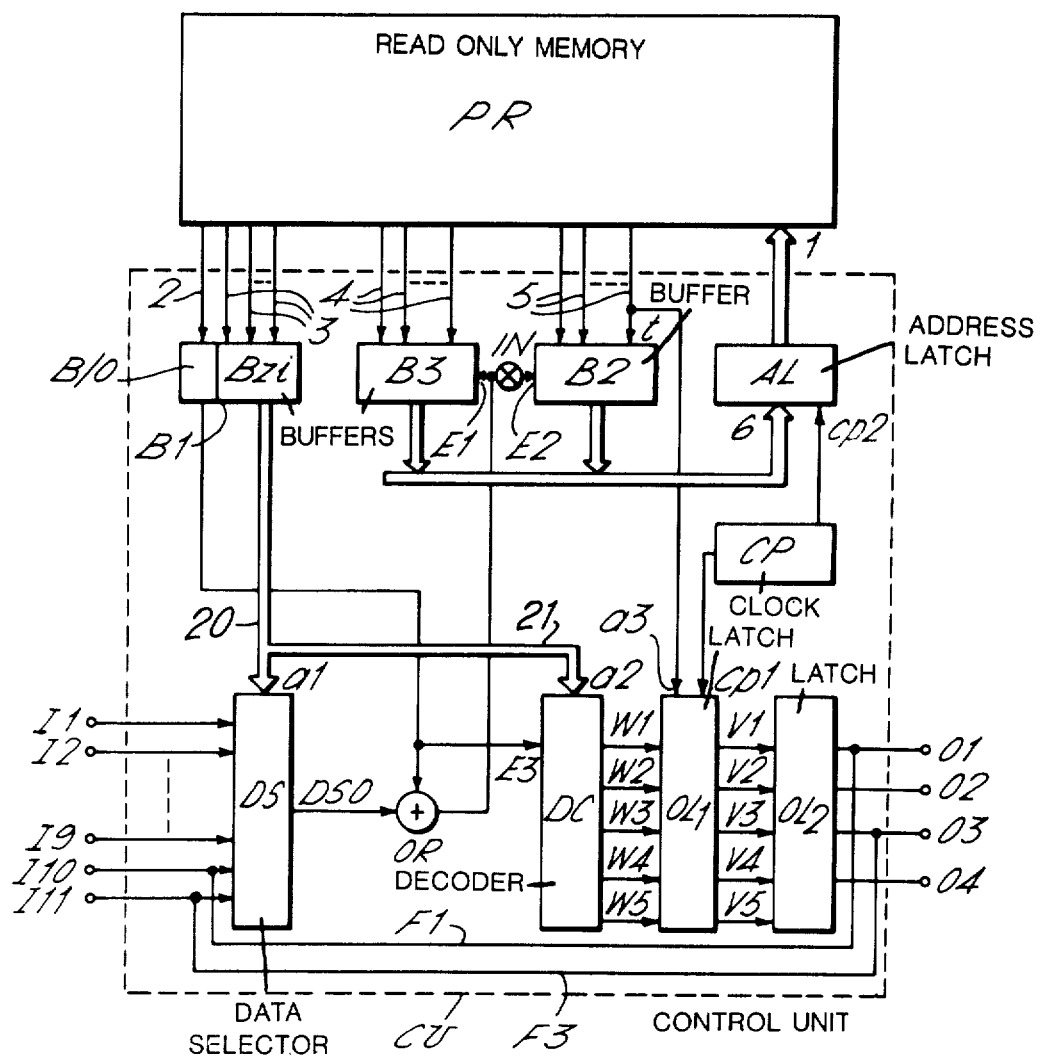
FIG. 1 schematically represents a program controlled device according to the invention.

Principally referring to FIG. 1 the program controlled device and more particularly the programmable controller schematically shown therein includes a memory PR and a control unit CU. The memory PR is a programmable read-only memory having an memory input 1, memory outputs 3, 4 and 5 and a data output 2.

The control unit CU includes logic circuitry, an input circuit or data selector DS having an address input a1, inputs I1 to I11 and output DSO and an output circuit comprising a decoder DC and output latches OL1 and OL2 the latter of which has device outputs O1 to O4 Viewing FIG. 1, there can be seen the inputs or input conductors I1-I11, the outputs or output conductors V1-V5 of the first output latch stage OL1 and the output conductors of the apparatus O1-O4. These outputs or output conductors are capable of being in one or another condition, the condition being called herein the value of the particular output or the output variable. These variables are designated by numerals in Table I (later herein) as X1-X9 for input variables of inputs I1-I9 and output variables U1-U5 as the condition of respective outputs V1-V5 of latch OL1. The data selector DS connects an input Ii (i=1 to 11) to its output DSO when the address of il is correlated with its address input a1. In this way the binary state of an input variable Xi (i=1 to 9) fed to the corresponding input Ii (i=1 to 9) or the binary state of an output variable Ui (i=1, 3) fed back from the outputs Oi (I=1, 3) to the inputs I10 and I11 via the feedback lines F1 and F3 respectively appears at the data selector output DSO. The decoder DC has an enabling input E3, an address input a2 and outputs W1 to W5 connected to the write inputs of the latch OL1. The decoder outputs and the latch inputs have the same references. This decoder DC activates an output Wi (i-1 to 5) when the corresponding address is fed to its address input a2 and when the enabling input E3 is activated.

The latch OL1 has a data input a3 connected to conductor t of the memory address output 5, a clock pulse input cp1 and outputs V1-V5. The decoder DC and output latches OL1 and OL2 are connected in cascade as shown. Upon the arrival of a clock pulse fed to the clock pulse input cp1 the output latch OL1 feeds the binary state pesent at the data input a3 to an output Vi if a corresponding write input Wi is activated. The output latch OL2 connects the outputs Vi (i=1 to 4) of OL1 to the respective device outputs Oi (i=1 to 4) when the output V5 is enabled. It is obvious that the number of inputs and outputs if not necessarily limited to 11 and 4 respectively. The number of inputs which may be a power of 2 will generally be larger than the number of outputs.

As mentioned above the binary state of input variables X1 to X9 are are present on the inputs I1 to I9. The above binary states may correspond for instance to the open or closed conditions of certain switches. The binary states of output variables U1 to U4 are are present on the device outputs of O1 to O4 respectively. The output states of device outputs O1-O4 may correspond for instance, to the energized or de-energized conditions of relays, solenoids, motor starters, or other suitable output devices.

The logic circuitry comprises buffers B1, B2 and B3, the last two of which have enabling inputs E2 and E1 respectively, an address latch AL having an address input 6 and clock pulse input cp2, a clock pulse generator CP, an OR gate OR and an inverter IN. The buffers B1, B2 and B3 are used as an interface between the memory PR and the input and output circuits. The buffer B1 includes buffer portions B/O and BZi. Portion B/O is a single bit binary condition storage unit for transferring binary values of B/O=0 or 1. The BZi portion is used to transfer the address of an input Ii or an output Ui read out from the memory PR respectively. The address buffers B2 and B3 provide the addresses of the program instructions to the address busses which connect the outputs of the buffers B2 and B3 to the input 6 of the address latch AL as explained below.

The output of the buffer stage B/O is connected to the enabling input E3 of the decoder DC and is also connected to one of the inputs of the OR-gate OR the other input of which is connected to receive a signal from the output DSO of the data selector DS. The output of the OR-gate OR is connected to the enabling input E1 of the buffer B3 and to the enabling input E2 of buffer B2 via the inverter IN. The output of the address buffer Bzi is connected to the address inputs a1 and a2 of the data selector DS and decoder DC via address busses 20 and 21 respectively.

The instruction program used in order to compute the values of the above-mentioned output variables U1 to U4 from a set of input variable values Xi which may possibly include a number of feedback output variable values, is a binary-decision program of the form explained by C. Y. Lee in his above-mentioned paper. Such a binary-decision program is made up of series of instructions of the same type wherein the address of each following instruction depends on the binary value of a variable read. As a result of the above sequential examination of each addressed input variable, the binary value of each output variable is obtained. The above-mentioned method used will become clear from the following example, where nine input variables X1 through X9 are connected to the inputs I1 to I9 respectively, and where two outputs O1 and O3 (out of a total of four, O1 through O4) are fed back to inputs I10 and I11 respectively.

It is supposed that the input variables X1 to X9 and output variables U1 to U4 are linked by the Boolean expressions:

$U1 = X1X3 + X1U1$
$U2 = X2X4$
$U3 = X6 (X4X5 + X7X8 + X8X9)$
$U4 = X4U3$

In this set of equations, the values of the output variables U1 and U3 are fed back since the output variables U1 and U4 respectively are dependent on the values of outputs U1 and U3.

Figure 2:
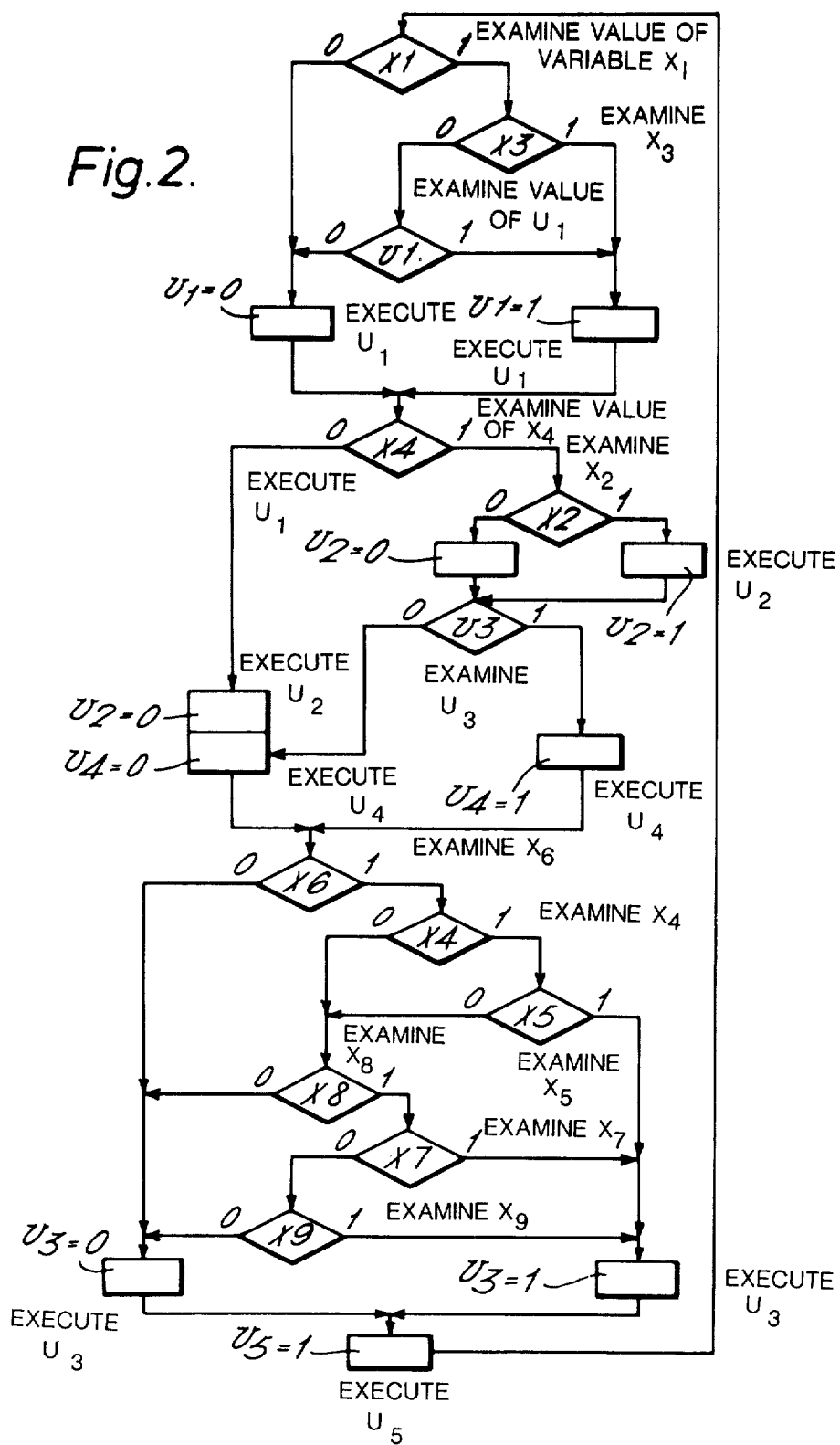
FIG. 2 is a flow chart showing the operation of the device represented in FIG. 1.

The method used will be readily understood by referring to FIG. 2 wherein a binary-decision tree or logic flow chart is shown. In the chart, the binary value of each input variable is examined and the next decision depends on the binary value of the variable examined. First the binary value of X1 is examined. When X1=0, U1=0 whereas when X1=1, X3 has to be examined. When X3=0, the value of U1 has to be examined. When X3=1, U1=1, etc. After the value of the output variable U1 has been obtained, X4 is examined in the same manner as explained above. In this way all the output variable values are obtained at the end of the program cycle. The output variable U5 is a fictitious output variable, the necessity of which will become apparent further below.

The corresponding program of instruction to be carried out to obtain these output variables is shown in Table I.

In this table, the first column lists the instruction address in the memory PR in numerical order, the remaining columns showing information stored for the specific instruction addresses A1-A22. The second column shows the type of instruction to be implemented for a given instruction address. The instruction being either a branch instruction—B or an output instruction —O. The third column entitled "Variable" lists the address of the variable (input or output to be read). The next two columns lists the instruction address to be transferred to the respective B2 and B3 buffers dependent on which of the buffer memories is enabled by the OR circuit and inverter circuit. The final column shows the output variable value resulting from the output instructions. This program includes a logical succession of Branch (B) and Output (0) instructions. A branch instruction is given as long as it is necessary to examine a variable, either input or output. The output instruction is given when the binary value of the output variable logically follows.

Each branch instruction B includes an operation code B/O=0, the address of an input and the addresses of two instructions one of which is a possible next instruction. The fourth or fifth column of Table I include the addresses of next instructions for which the binary value of the variable examined is 0 or 1 respectively.

It should be noted that it is not absolutely necessary to include two addresses in each branch instruction. Indeed, one could consider a branch instruction with one address only, this address being the address of a next instruction in case the input variable examined has a given binary value, e.g., 1. In this case the other address could, for instance, be determined by a counter adding one to the address of the previous instruction when the variable examined has the other binary value, i.e., 0. Such a one address instruction type has the advantage of needing less bits per instruction, but is disadvantageous in that the instruction program is less flexible in case of program change which is necessary when additional input and output variables are introduced.

Each output instruction includes an operation code B/O=1, the address of an output, the binary value of the output variable collected at the corresponding output and the address of a next following instruction.

Instruction with address A1 is a branch instruction B and X1 is examined. If X1=0, the instruction with address A2 is to be carried out. The instruction (A2) is an output instruction. The binary value of the output variable is 1 as indicated in the fifth column and A6 is the next instruction address.

TABLE I

| Address of Instruction | Branch/ Output Instruction | Variable | Address of next instruction when variable is 0 | Address of next instruction when variable is 1 | Output Variable Value |
|---|---|---|---|---|---|
| A1 | B | X1 | A2 | A3 | |
| A2 | 0 | U1 | — | A6 | 0 |
| A3 | B | X3 | A4 | A5 | |
| A4 | B | U1 | A2 | A5 | |
| A5 | 0 | U1 | — | A6 | 1 |
| A6 | B | X4 | A7 | A8 | |
| A7 | 0 | U2 | — | A9 | 0 |
| A8 | B | X2 | A10 | A11 | |
| A9 | 0 | U4 | — | A14 | 0 |
| A10 | 0 | U2 | — | A12 | 0 |
| A11 | 0 | U2 | — | A12 | 1 |
| A12 | B | U3 | A9 | A13 | |
| A13 | 0 | U4 | — | A14 | 1 |
| A14 | B | X6 | A15 | A16 | |
| A15 | 0 | U3 | — | A22 | 0 |
| A16 | B | X4 | A17 | A18 | |
| A17 | B | X8 | A15 | A19 | |
| A18 | B | X5 | A17 | A20 | |
| A19 | B | X7 | A21 | A20 | |
| A20 | 0 | U3 | — | A22 | 1 |
| A21 | B | X9 | A15 | A20 | |
| A22 | 0 | U5 | — | A1 | 1 |

If X1=1, the next instruction with address A3 has to be carried out. This instruction (A3) is a branch instruction. If X3=0 or 1, the next instruction address is A4 or A5 respectively. The instruction with address A5 is an output instruction, since the binary value 1 of the output variable U1 is known and A6 is the address of the next following instruction. The process continues on until the values of all the output variables have been obtained and then, the program cycle is repeated.

From the above, it follows that the maximum number of steps to be carried out is equal to the number of input variables and output variables. A supplementary instruction with address A22 may possibly be needed in case a second output latch OL2 is used as explained later.

The operation of the programmable controller shown on FIG. 1 is as follows. As an example, it is assumed that the memory PR is addressed with the address A1. From Table I, it can be seen that the corresponding instruction is a branch instruction for which B/O=0 which checks the input variable Xi.

An explanation of how the memory address A1 is obtained will be provided further in this explanation. The buffer stages B/O and Bzi transfer the binary value B/O=0 and the address of input I1.

If X1=0 the data selector output DSO will be low since the state of X1 fed to the input terminal I1 is supplied to the output DSO, as explained earlier. Since also B/O=0, the output of the buffer B2 is enabled as the output of the buffer B3 is disabled. Buffer B2 is able to transfer the instruction addresses of the fourth column (variable is 0) of Table I and transfers the address of A2 which appears at the address latch input 6. Upon the occurrence of a clock pulse and more particularly at the leading edge thereof the address latch AL supplies the address A2 to the memory input 1. As a consequence thereof, the instruction with address A2 is read out. This instruction is an output instruction for which B/O=1 and which is used to make the output variable U1 appear at the output O1. The buffer stages B/O and Bzi transfer the binary value B/O=1 and the address of the output variable U1. The address of this output variable (U1=0) which appears at the terminal "t" of the memory address output 5 is fed to the data input a3 of the latches OL1. Since now B/O=1, buffer B3 and the decoder DC are enabled. The decoder DC once enabled, activates its output W1 and the address A6 appears at the address latch input 6, the buffer B3 being able to transfer the addresses of the fifth column (variable true) of Table I. Upon the occurrence of the leading edge of a next following clock pulse, the output latch OL1 supplies the binary value 0 at its V1 output and the memory PR is addressed with the address A6 of the next instruction which is a branch instruction to check the input variable X4.

The instruction with address A7 or A8 will subsequently be carried out depending on whether X4 exhibits the binary value 0 or 1 respectively.

If X1=1 the data selector output DSO will be high and only the buffer B3 is enabled so that the address A3 appears at the address latch input 6. With the arrival of the above first clock pulse, the memory is addressed with A3 and a small time interval thereafter the memory buffer transfers the following information:

| BUFFER | INFORMATION | COMMENTS |
|--------|-------------|----------|
| B/O | 0 | Branch instruction |
| Bzi | Address I3 | Examine X3 |
| B2 | A4 | Depend on the binary value of X3 |
| B3 | A5 | Depend on the binary value of X3 |

The state of the input variable X3 now appears at the data selector output DSO and instructions with address A4 or A5 will be executed depending on whether X3 has the binary value 0 or 1 respectively. All the instructions of the program are thus sequentially carried out in the above described manner until the values of all the output variables have been obtained at the output terminals of output latch OL1. With the last output instruction 22, output U5 of the output latch OL1 is enabled and upon the occurrence of a clock pulse which also enables the address latch AL to supply the address A1 to the memory PR, the states of the output variables U1 to U4 are transferred to the respective outputs O1 to O4 of the output latch OL2 which in its turn has been enabled by the U5 output of output latch OL1.

It should be noted that the use of a second output latch OL2 is necessary only in case race conditions may occur, i.e., when output variable values are computed using other output variable values that were already changed during the same program cycle. This may for instance, occur when X9=U1.

It should also be noted that it may be necessary to provide a number of supplementary instructions which automatically refer to instruction with address A1 for instance. For example, at the start of the functioning of the controller, the buffers B2 and B3 may store an address which is not one of the 22 addresses A1 to A22. The controller would be unable to initiate the program in the absence of supplementary instructions detailing what address should be examined.

Although the above example has assumed binary values as the values of which determine the choice of the address of the next instruction, it will be clear that the invention is not limited to the use of the above binary values. In case the variables assume more than two, e.g., three values, the instruction would, for instance, include three possible next instruction addresses, the choice of the next instruction depending on the value of the variable examined.

While the principles of the invention have been described above in connection with specific apparatus, it is to be clearly understood that this description is made only by way of example and not as a limitation on the scope of the invention.

I claim:

1. A process control apparatus including a memory for storing a program of instructions and a control unit, said control unit including an input circuit having a plurality of inputs for receiving signals representing the condition of said plurality of inputs, said control unit adapted to perform a selected one of said instructions in reading the input condition signal of a selected input to provide a value for a selected one of a plurality of outputs, the output variables each being related to the condition of said inputs of predetermined relationship and said control unit further including an output circuit with a plurality of outputs via which said plurality of output variables can be set and read, wherein said memory comprises storage for a first set of single type instructions, each such instruction correlated with the address of an input to be read and means in said control unit for deriving from the condition of said input read the address of a next following instruction from among at least two instructions of said program.

2. A process control apparatus according to claim 1, wherein said memory includes storage for a second set of single type instructions each of which is correlated with the address of an output variable to be set, its value and an address of the next following instruction, said program indicative of an instruction of said second set to be addressed each time when a predetermined input condition was read for the input previously examined.

3. A process control apparatus according to claim 1, wherein the choice of said next following instruction among said two instructions made by said deriving means depends on the binary value of said input condition and that each instruction of said first set is correlated with the address of at least one of said two instructions.

4. A process control apparatus according to claim 3, wherein each instruction of said first set is correlated with the addresses of said two instructions, and wherein there is included a clock pulse generator and that said deriving means includes gating circuitry cooperating with said input circuit to enable said next instruction address to be applied to the read input of said memory at each clock pulse.

5. A process control apparatus according to claim 1, wherein said output circuit includes a first and a second output latch coupled in cascade, said first output latch being enabled to set the binary value of said output variables at its outputs during a program cycle and to enable said second output latch at the end of each program cycle, said second output latch then supplying a read out of all said output variables at its output to complete a program cycle.

* * * * *